UNITED STATES PATENT OFFICE.

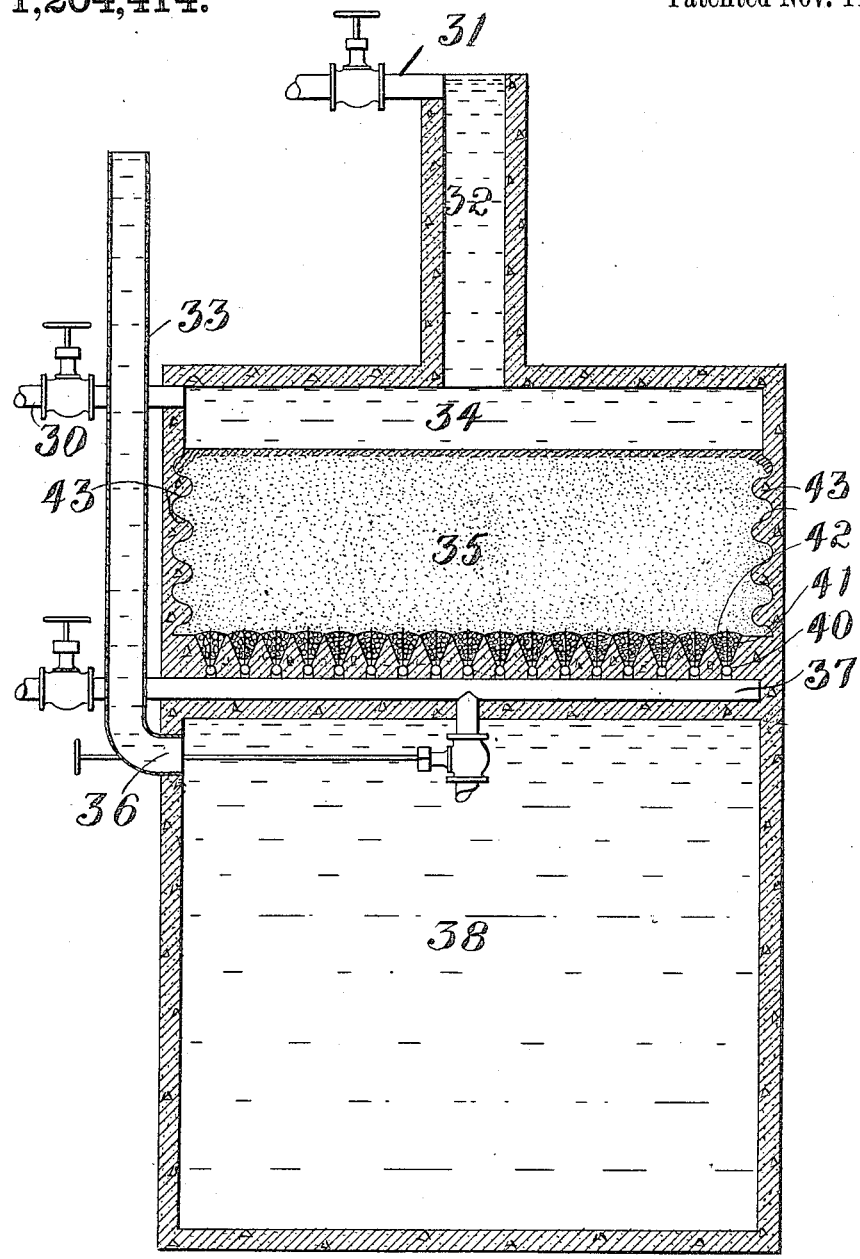

HENRY WARRINGTON COWAN, OF TORONTO, ONTARIO, CANADA.

FILTER.

1,204,414.     Specification of Letters Patent.     Patented Nov. 14, 1916.

Application filed March 26, 1914. Serial No. 827,378.

*To all whom it may concern:*

Be it known that I, HENRY WARRINGTON COWAN, a subject of the King of Great Britain, and a resident of Toronto, county of York, and Province of Ontario, Canada, have invented a new and useful Improvement in Filters, of which the following is a specification.

My invention relates to filters and specifically appertains to water filters of the type in which water is allowed to flow through, or is forced, or drawn through a granular filter bed composed of sand, charcoal, crushed quartz, or other suitable material, which retains the impurities in water.

It is well known that, as a filter bed becomes dirty, a greater water pressure is required thereon to maintain the same rate of flow of water through the filter. In the type of filter which is open to the atmosphere the pressure on the filter bed is supplied by a down draft tube from the filter, on which a controller is placed to maintain a constant rate of flow of water. In this way the pressure under the filter bed is reduced to impart an excess pressure on the top of the filter bed, the system being known as the negative head process. This system tends to create a vacuum in the filter bed below the surface and thus tends to draw air from the water, which lodges in the filter bed and impedes the passage of water through the filter.

When the granular filter bed becomes dirty it is customary to pass filtered water back through the filter bed at the same time agitating the bed by means of compressed air or a mechanical device. The dirt thus loosened is removed by the wash water flowing into a drain at a height above the filter bed high enough to prevent the filter material being washed out and yet low enough to allow the dirt to be washed away. By increasing the height of water above the filter bed as the bed becomes dirty the same effect can be secured as that given by the down draft tube in negative head process without the disadvantages accruing from releasing air in the filter bed. It will be noted that this height of water above the filter bed varies with the pressure required, dependent upon the clear or dirty condition of the filter bed and at some times may require to be several feet. It will thus be seen that when the filter bed requires cleaning this added quantity of water above the height at which the wash water flows out will have to be run off until the level of the water upon the filter bed reaches the point at which the washing takes place. Such a process obviously wastes an enormous quantity of water and causes this method, which is known as the positive head process, to be but little practised.

One of the principal objects of my invention is to reduce this waste of water in order to economically utilize and realize the advantages of the positive head process of filtration.

Other objects of my invention comprise the novel methods of construction and interrelation of parts as shown in the drawing which accompanies and forms a part of this specification.

Referring now to the drawing which illustrates a diagrammatic sectional view of my improved filter, the pipe 31 delivers unfiltered or raw water to the unfiltered water chamber 32 and 34, from which the water passes through the granular bed 35, thence through a perforated floor plate 42, through a bed of secondary or coarse filtering material 41 to collecting pipes and thence to a filtered water pipe 37 and finally to the filtered water chamber 38, the proper valves being supplied as shown to control the passage of the water to, through and from the filter.

In my invention I contract or restrict the plan area of a portion of the unfiltered water chamber by a novel construction, as shown, in order to reduce the volume of water above the filter bed without decreasing the height of the water above the bed that the pressure per square inch of the water on the filter bed shall remain undisturbed. This container 32 of relatively small plan area in comparison to the area of the filter bed allows the water to rise to the level of the incoming raw water pipe 31 and to thus impart sufficient pressure upon the filter bed to insure the proper action of the filter. By this novel construction I am able to produce the same pressure upon the filter bed as that necessary in positive head filters but with considerably less volume of water than has hitherto been necessary and consequently when the water above the drain pipe 30 is run off preparatory to the operation of washing the filter the quantity of water wasted is very much smaller in my improved filter than with filters previously known, in fact, there is so little waste water in my filter that the positive head process may economically be employed, and the positive head process is extremely desirable in that it prevents in a very large degree the formation of air in the filter bed which tends to reduce the capacity of the filter.

While I have shown one embodiment of my invention I do not wish to be limited thereto and it should be fully understood that I may alter the details of my invention without narrowing the scope of the invention.

Having thus described my invention what I claim as new and desire to secure by United States Letters Patent is as follows:

1. In a filter, an unfiltered water chamber, a filtered water chamber and a filter bed therebetween, an overflow pipe communicating with said unfiltered water chamber, said chamber having a plan area substantially equal to that of said filter bed below said overflow pipe, and said chamber having a plan area considerably less than said filter bed above said overflow pipe.

2. In an atmospheric filter, an unfiltered water chamber, a filtered water chamber and a filter bed therebetween, an outlet pipe communicating with said unfiltered water chamber below the water level therein, said unfiltered water chamber having a plan area substantially equal to that of said filter bed below said outlet pipe, and said chamber having a plan area considerably less than said filter bed above said outlet pipe.

3. In an atmospheric filter, an unfiltered water chamber, a filtered water chamber, and a filter bed therebetween, an outlet pipe communicating with said unfiltered water chamber at substantially the level that wash water rises in said chamber during the washing out process, said chamber having a plan area substantially equal to that of said filter bed below said outlet pipe, and said chamber having a plan area considerably less than said filter bed above said outlet pipe.

Signed by me at Toronto, county of York and Province of Ontario, Canada, in the presence of two witnesses.

HENRY WARRINGTON COWAN.

Witnesses:
JAMES M. SINCLAIR,
RETA DARCH.

Copies of this patent may be obtained for five cents each, by addressing the "Commissioner of Patents, Washington, D. C."